US012217710B2

(12) United States Patent
Tang et al.

(10) Patent No.: US 12,217,710 B2
(45) Date of Patent: Feb. 4, 2025

(54) LED-DISPLAY-SCREEN DRIVE CHIP AND LED DISPLAY SCREEN

(71) Applicant: Chengdu Lippxin Microelectronics Co., LTD, Chengdu (CN)

(72) Inventors: Yongsheng Tang, Chengdu (CN); Shilin Shen, Chengdu (CN); Aqiang Liu, Chengdu (CN); Shixiong Lu, Chengdu (CN)

(73) Assignee: Chengdu Lippxin Microelectronics Co., LTD, Chengdu (CN)

( * ) Notice: Subject to any disclaimer, the term of this patent is extended or adjusted under 35 U.S.C. 154(b) by 0 days.

(21) Appl. No.: 18/497,006

(22) Filed: Oct. 30, 2023

(65) Prior Publication Data

US 2024/0169939 A1 May 23, 2024

(30) Foreign Application Priority Data

Nov. 14, 2022 (CN) ......................... 202211419690.5

(51) Int. Cl.
*G09G 3/34* (2006.01)
*G09G 3/32* (2016.01)

(52) U.S. Cl.
CPC ............. *G09G 3/3426* (2013.01); *G09G 3/32* (2013.01); *G09G 2320/0233* (2013.01); *G09G 2320/0271* (2013.01)

(58) Field of Classification Search
None
See application file for complete search history.

(56) References Cited

FOREIGN PATENT DOCUMENTS

| | | | |
|---|---|---|---|
| CN | 113870768 | * 12/2021 | G09G 3/32 |
| CN | 114067731 | * 2/2022 | G09G 3/32 |

* cited by examiner

*Primary Examiner* — Ifedayo B Iluyomade
(74) *Attorney, Agent, or Firm* — Flener IP & Business Law; Zareefa B. Flener

(57) ABSTRACT

Provided are LED-display-screen drive chip and LED display screen, wherein the drive chip is configured such that: when a grayscale value R of a grayscale data is less than or equal to Q, the grayscale data is allocated to one display group in M display groups; and when the grayscale value R of the grayscale data is larger than Q, the grayscale value of one display group of the M display groups is P, wherein P>=Q, and a total grayscale value of remaining M−1 display groups is R−P, wherein in display groups in the remaining M−1 display groups whose grayscale value is not 0, a number of display groups whose grayscale value is less than L is not more than 1, wherein L≥1, Q>L, and Q is a centralized display threshold. The present disclosure is capable of making the low-grayscale display effect smoother and improving the display effect.

20 Claims, 6 Drawing Sheets indicating that the lamp bead is on, the width indicates the length of time that the lamp bead is on

LED-DISPLAY-SCREEN DRIVE CHIP AND LED DISPLAY SCREEN

CROSS-REFERENCE TO RELATED APPLICATIONS

The present disclosure claims the priority to the Chinese Patent Application with the filing No. 2022114196905, and entitled "LED-DISPLAY-SCREEN DRIVE CHIP AND LED DISPLAY SCREEN", filed with the Chinese Patent Office on Nov. 14, 2022, the entire contents of which are incorporated herein by reference.

TECHNICAL FIELD

The present disclosure relates to the field of LED display, and more particularly, to an LED-display-screen drive chip and an LED display screen.

BACKGROUND ART

The common structure of the existing LED display panel is shown in FIG. 1. The LED row driver usually adopts power switch tubes, and the column driver usually adopts constant-current source driver. The constant-current source drive chip usually contains a plurality of constant-current output channels, and a constant-current output channel (OUT terminal) is connected to the column line in FIG. 1 (column 1/column 2 . . . ). The principle thereof is as follows.

First, the power tube of the first row is switched on, the power tubes of other rows are switched off, and the row lines of the other rows have high impedance.

The column driver, according to the display data of the first row, outputs a constant-current source correspondingly in column, lights the LED display lamp beads of the first row, and displays the display image of the first row.

In this way, the rows are changed in sequence until the images of all rows and all columns are displayed.

In order to increase the refresh rate, the image of one frame is usually displayed by dividing the frame into multiple sub-frames and displaying one sub-frame at a time, as shown in FIG. 2.

An image of one frame is divided into M display groups, at this time, the display refresh rate=frame rate*M (in which * denotes product sign), and the refresh rate is increased by M times.

Each of the display groups contains a complete display from the first row to the P-th row, and the display time of each row may have one or more display areas.

In the existing LED drive chip, when the grayscale value is low, there is a larger number of groups, and the grayscale value of each display group is low, which will lead to a plurality of non-ideal switching processes as the grayscale value increases when being low grayscale. For example, PWM is not an ideal square wave, and at this time, it will affect the actual display time, thus affecting the low-grayscale display effect.

The above problems are becoming urgent problems to be solved.

SUMMARY

The purpose of the present disclosure is to overcome the shortcomings of the existing technologies and provide an LED-display-screen drive chip and an LED display screen, which may make the low-grayscale display effect smoother and improve the LED display effect.

The purpose of the present disclosure is achieved by the following technical solutions.

The first aspect of the present disclosure provides an LED-display-screen drive chip, wherein the drive chip is configured such that:

when the grayscale value R of the grayscale data is less than or equal to Q, the grayscale data is allocated to one display group in M display groups: and when the grayscale value R of the grayscale data is larger than Q, the grayscale value of one display group of the M display groups is configured as P, wherein P>=Q, and the total grayscale value of the remaining M−1 display groups is R-P, wherein, in the display groups in the remaining M−1 display groups whose grayscale value is not 0, the number of display groups whose grayscale value is less than L is not more than 1, wherein L≥1, Q>L, and Q is the centralized display threshold.

In the present disclosure, by centralized displaying of the first Q gray levels of the low grayscale part in a certain one display group within a frame, and then performing an even allocation to the remaining unallocated grayscale values, the problem of unsmooth display when displaying a low grayscale in the prior art can be eliminated, thereby optimizing the display effect.

Optionally, when R−P<(M−1)*L, the grayscale value, of which the magnitude is R−P, is allocated to A groups in the remaining M−1 display groups with each group having a grayscale value of L, and the grayscale value of the remaining part which is less than L is allocated to the remaining M−1 display groups, wherein A is the integer part of (R−P)/L. When R−P≥(M−1)*L, the grayscale value of each display group in the M−1 display groups is at least L.

Optionally, when Q<R≤M*Q, the LED-display-screen drive chip is configured such that:

when C≥L, the grayscale value of one display group in M display groups is configured as Q+x, wherein x≥0, and the grayscale value of the i-th display group in the remaining M−1 display groups is configured as C+$x_i$, wherein $x_i$≥0, i∈{1, . . . , M−1} and $$x \square \sum_{i \square 1}^{M-1} x_i \square D;$$

and when C<L, the grayscale value of one display group in the M display groups is configured as Q+y, wherein y≥0, the grayscale value of the j-th display group in the M−1−A display groups is configured as $z_j$, wherein $z_j$≥0, j∈{1, . . . , M−1−A}, when A>0, the grayscale value of the k-th display group in A display groups in the M display groups is configured as L+$y_k$, wherein $y_k$≥0, k∈{1, . . . , A} and $$y \square \sum_{k \square 1}^{A} y_k \square \sum_{j \square 1}^{M-1-A} z_j \square B;$$

and when A=0, $$y\square\sum_{j\square 1}^{M-1-A} z_j\square B,$$

wherein A and B are the integer part and the remainder part of (R−Q)/L, respectively, while C and D are the integer part and the remainder part of (R−Q)/(M−1), respectively.

Optionally, when R>M*Q, the LED-display-screen drive chip is configured to allocate the grayscale data into the M display groups. At this time, the grayscale value of all M display groups is not 0.

Optionally, when C<L and A>0, $$\sum_{k\square 1}^{A} y_k\square B.$$

Optionally, when C<L, $$\sum_{j\square 1}^{M-1-A} z_j\square B,\ z_j\in\{0, B\}.$$

Optionally, when C<L, y=B.

Optionally, when C≥L, $$\sum_{i\square 1}^{M-1} x_i\square D,\ x\square 0.$$

Optionally, $x_i \in \{0, 1\}$, $i \in \{1, \ldots, M-1\}$.

Optionally, when R>M*Q, the LED-display-screen drive chip is configured such that:

the grayscale value of the h-th display group in the M display groups is $E+f_h$, wherein $h \in \{1, \ldots, M\}$ and $$\sum_{h\square 1}^{M} f_h\square F,$$

wherein E and F are the integer part and the remainder part of R/M, respectively.

Optionally, $f_h \in \{0, 1\}$, $h \in \{1, \ldots, M\}$.

The second aspect of the present disclosure provides an LED display screen, including a display panel and the LED-display-screen drive chip as mentioned in the first aspect.

The beneficial effects of the present disclosure are:

compared to the prior art, in the present disclosure, by configuring the driving mode of the LED-display-screen drive chip cleverly, and performing a centralized display to the low-grayscale data, the problem of unsmooth display when displaying low grayscale data can be eliminated, thereby significantly improving the display effect.

DETAILED DESCRIPTION OF EMBODIMENTS

The technical solution of the present disclosure is described in further detail below in conjunction with specific embodiments, but the scope of protection of the present disclosure is not limited to what is described below.

Figure 1:
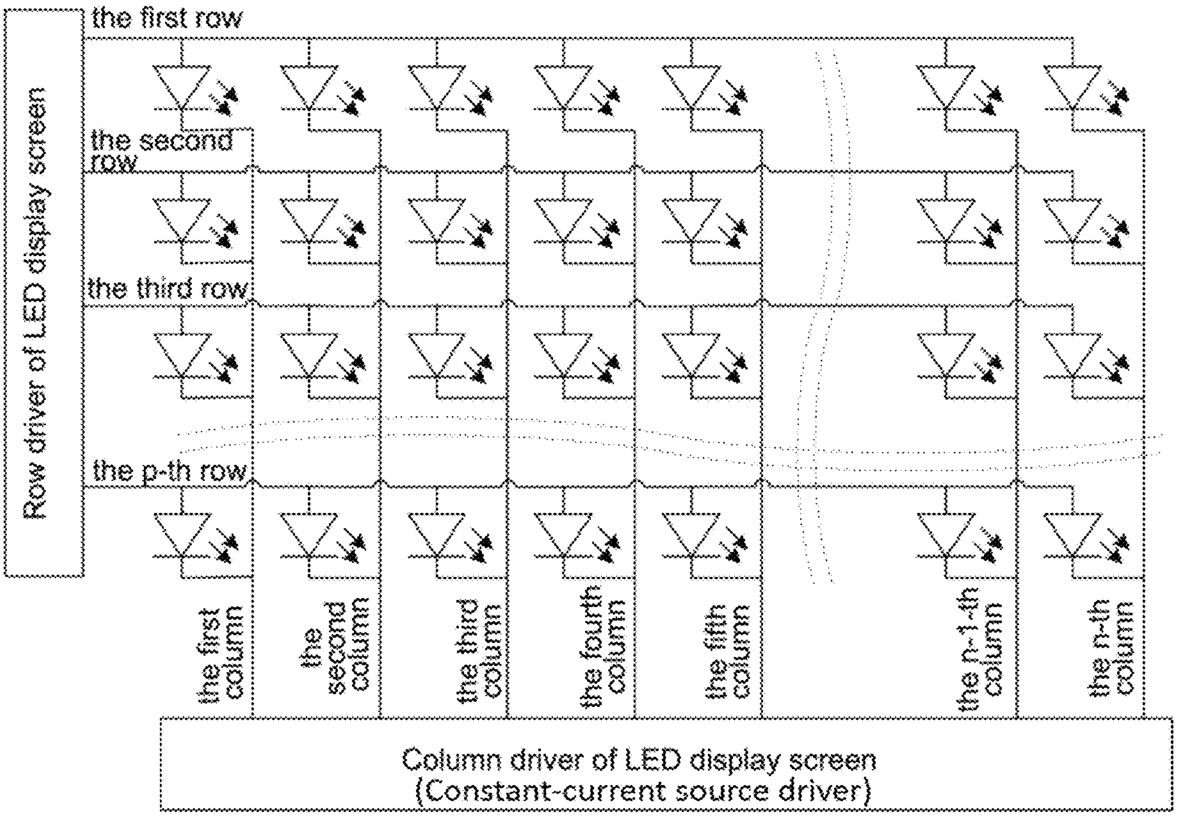
FIG. 1 shows a common structure of an unit panel of an LED display screen provided by the prior art.
Figure 2:
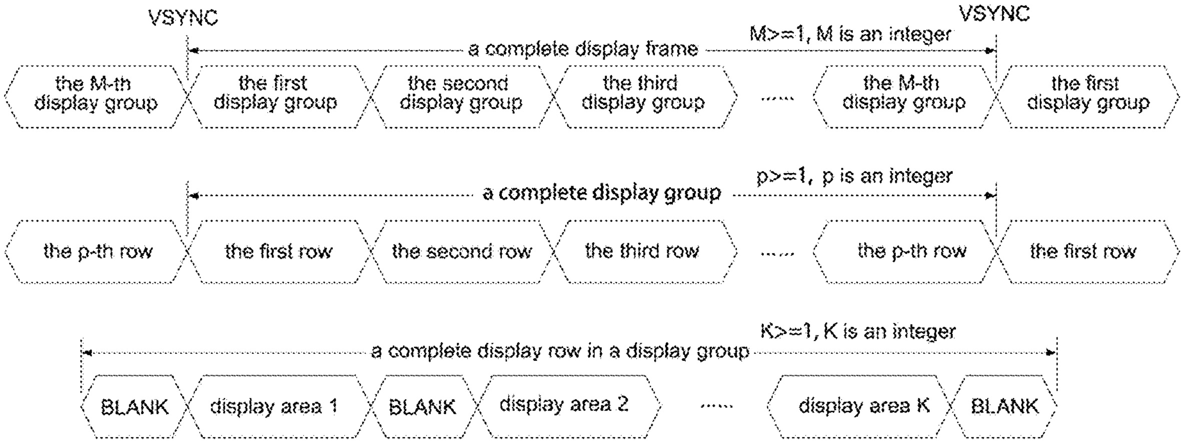
FIG. 2 is a schematic display diagram of an image of one frame provided by the prior art.

For the convenience of subsequent description, the symbols related to the present disclosure are briefly explained. In the present disclosure, the number of display data bits is N-bit, the number of display groups is M (an image of one frame is divided into M sub-frames, that is, M display groups, wherein M is an integer, generally, M is greater than or equal to 2, preferably, M is greater than or equal to 3, referring to FIG. 2 for details), and the grayscale threshold of the centralized display is Q; and grayscale value R of grayscale data (display data) refers to the total grayscale value of the lamp bead in the image of one frame, and the grayscale value of each display group refers to the share of grayscale value R allocated to each display group. The total grayscale value of all M display groups is equal to the total grayscale value R (greater than or equal to 0). The grayscale value is not 0, which indicates that the lamp bead is lit, and the magnitude of the grayscale value indicates the length of time that the lamp bead is lit. The LED-display-screen drive chip may drive the LED display screen (display panel) to display according to the grayscale value of each display group. That is to say, according to the grayscale value of each sub-frame, the LED display screen is driven to display the image of each sub-frame of one frame of image in sequence. In addition, in FIGS. 3-7 of the present disclosure, the vertical axis represents the magnitude of the total grayscale value of the grayscale data, and the dark part (width or the number of dark boxes) in each display group represents the magnitude of the grayscale value of this display group. The sum of the width of the dark part or the number of dark boxes in a plurality of display groups represents the total grayscale value of the grayscale data. The dark part indicates that the lamp bead is lit, and the width of the dark part (i.e., the magnitude of the grayscale value) represents the length of time that the lamp bead is lit.

An embodiment of the present disclosure provides an LED-display-screen drive chip, wherein the drive chip is configured such that:

when the grayscale value R of the grayscale data is less than or equal to Q, the grayscale data is allocated into one display group in M display groups;

when the grayscale value R of the grayscale data is larger than Q, the grayscale value of one display group of the M display groups is configured as P, wherein P>=Q, and the total grayscale value of the remaining M−1 display groups is R−P, wherein, among the remaining M−1 display groups, the number of display groups whose grayscale values are each less than L but not 0 is not more than 1, wherein L≥1, Q>L, and Q is the centralized display threshold.

In order to obtain a smooth display effect when the grayscale is low, in the present disclosure, the centralized display threshold Q is set. According to the relationship between the magnitude R of the grayscale value of the grayscale data and the centralized display threshold Q, how to allocate the total grayscale value R in M sub-frames (M display groups) of an image of one frame is determined, and then the LED drive chip drives the display according to the grayscale value of each display group. That is to say, the present disclosure is actually to determine a way, in which LED-display-screen drive chip drive the LED display screen to display.

Specifically, in the present disclosure, the low-grayscale data (the grayscale value R is less than or equal to the centralized display threshold Q) is concentrated in one display group (one certain group in the M groups may be fixedly selected, for example, as long as R is less than or equal to Q, it is allocated to the first group; one of the groups may also be arbitrarily selected in the M groups. Taking Q=8 as an example, when R=4, the first group is selected, and when R=5, the third group is selected) to display.

When the grayscale value R of the grayscale data is greater than the centralized display threshold Q, at least one display group of the M display groups has a grayscale value at least equal to the centralized display threshold Q. For example, firstly, the grayscale value of one display group is configured as Q, and then the remaining unallocated grayscale value (magnitude is R−Q), as additional grayscale value, is allocated in a relatively even manner to one or more display groups in all M display groups of an image of one frame (including the display group with grayscale value previously configured as Q).

In the present disclosure, the centralized display grayscale threshold Q is a fixed value or adjustable, that is, the centralized display grayscale threshold Q may be set to be fixed as needed, or the value may be adjusted appropriately and timely according to the display needs.

It should be noted that the present disclosure may select one group in the M groups to be fixed as a centralized display group, for example, the fourth group. When the grayscale value of the grayscale data is less than or equal to the centralized display threshold, the grayscale data is allocated intensively to the group. When the grayscale value of the grayscale data is greater than the centralized display threshold, the grayscale value of the group is configured as P (P≥Q), and the remaining unallocated grayscale value (magnitude is R−P) is allocated to one or more of the remaining M−1 display groups. Certainly, it can also be non-fixed. When the grayscale value of the grayscale data is less than or equal to the centralized display threshold, any one group of the M display groups is selected for centralized display. When the grayscale value of the grayscale data is greater than the centralized display threshold, the grayscale value of one display group of the M display groups is firstly configured as Q (to ensure that grayscale value of at least one display group is at least Q), and the remaining grayscale value (magnitude is R−Q) is allocated in all M display groups (including the display group with grayscale value previously configured as Q), wherein the remaining grayscale value refers to the remaining unallocated grayscale value after partial allocation of grayscale data.

Figure 3:
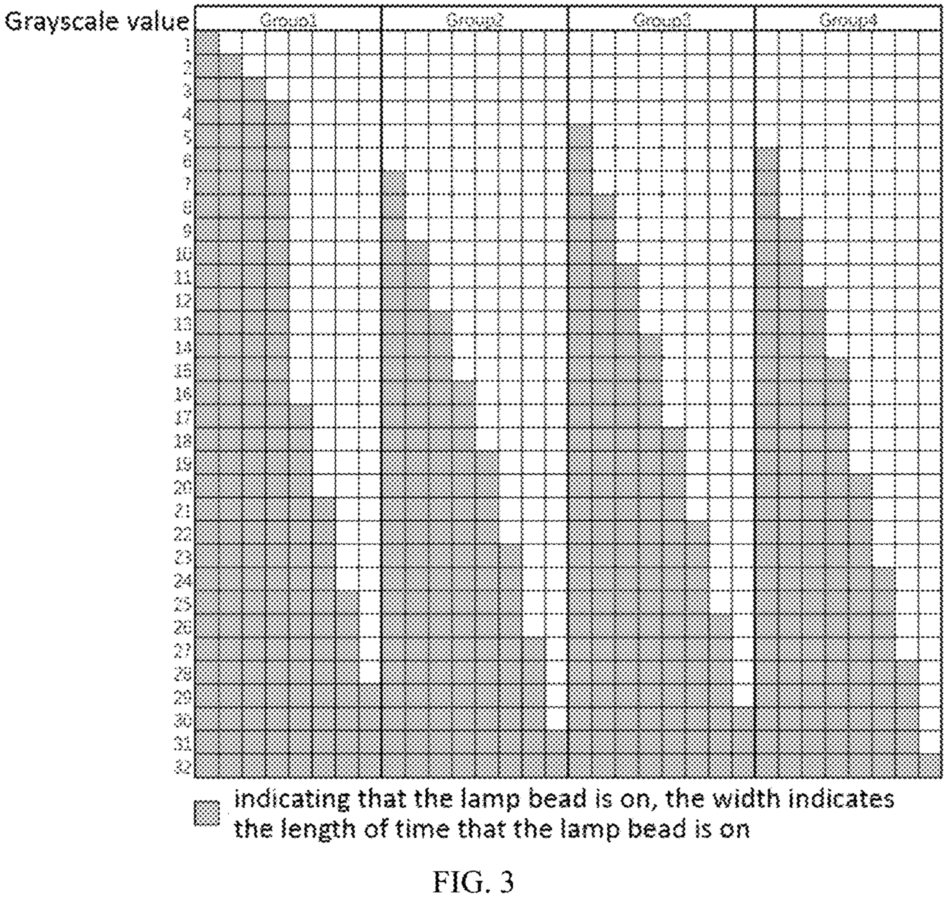
FIG. 3 is the first schematic diagram of grayscale allocation provided by an embodiment of the present disclosure.

Taking Q=4, and L=1 as an example, as shown in FIG. 3, when the grayscale value R of the grayscale data is less than or equal to 4, the total grayscale value is uniformly allocated to the first group for centralized display (that is to say, the grayscale value of the first group is R, while the grayscale value of each group of others is 0); and when the grayscale value of the grayscale data is greater than 4, for example, when the grayscale value is 5, the grayscale value of the first display group is configured as 4, and the remaining grayscale value (magnitude is 1) is allocated to the remaining three groups (which is the third group in the figure). When the grayscale value is between 5 and 16, the remaining grayscale value (1 to 12) is allocated only in the second to the fourth display groups. If the grayscale value of the grayscale data is relatively large (e.g., more than 16), the grayscale value of each display group may be configured to be at least Q, then the remaining grayscale value (magnitude is R−Q) is considered to be allocated in all M display groups. Certainly, the remaining grayscale value (magnitude is R−Q) may also be allocated directly by selecting display groups in all M display groups from the beginning, not just to be allocated in the remaining M−1 display groups.

It should be noted that the allocation of grayscale value should be as uniform as possible. Assuming that data is allocated in the first group, it is the best not to allocate data in the display group adjacent to the first group. Referring to FIG. 3, when the grayscale value of the grayscale data is 5, the remaining grayscale value (magnitude is 1) is allocated to the third display group. When the grayscale value of the grayscale data is 6, the remaining grayscale value (magnitude is 2) is allocated to the third and fourth groups. When the grayscale value of the grayscale data is 7, the other three groups are respectively allocated with an additional grayscale value of which the magnitude is 1. In this way, the allocation may be relatively even, and the grayscale data will not be completely concentrated in one certain group or several groups, but relatively even in all display groups.

A threshold L greater than or equal to 1 is set in the present disclosure. For the aforementioned M−1 display groups, the number of display groups in which the allocated grayscale value is less than L but not 0 is not greater than 1. The M−1 display groups are groups of the aforementioned M display groups other than the above display group with the grayscale value of P. That is to say, referring to FIG. 4-FIG. 6, L=3, assuming that the grayscale value is 5, it may be divided into 4+1 and 5+0. Assuming that the grayscale value is 6, it may be divided into 4+2, 5+1, and 6+0, and the case of 4+1+1 will not occur.

In the present disclosure, L is not equal to Q, especially it can be selected that L is less than Q. Optionally, L is greater than 1. Preferably, L is an integer. It should be noted that, in the present disclosure, Q may be selected as an integer.

In some embodiments, the grayscale data is classified according to the grayscale value, and the grayscale value is allocated according to the divided grayscale level, so as to determine the manner to display.

Optionally, the grayscale value may be divided into three levels. For example, two thresholds are set for the grayscale data, that is, the aforementioned centralized display threshold Q and the first grayscale threshold S, wherein S is greater than Q. According to the level that the grayscale value of the grayscale data belongs to, the grayscale value of each display group is determined.

When R≤Q, the grayscale data is allocated to one display group of the M display groups.

When Q<R≤S, the grayscale data is allocated to one or more of the M display groups. The grayscale value of one or more of the M display groups is not 0, and the grayscale value of one display group is greater than or equal to Q.

When R>S, the grayscale data is allocated to the M display groups. That is to say, the grayscale value of each display group is not 0, and it is the best that the grayscale value of each display group is close, so as to ensure uniformity.

For each level of grayscale data, by using different display drive manners or grayscale allocation manners, the grayscale value may be relatively evenly allocated to the M display groups of one complete frame to achieve a double-win situation of high refresh rate and display smoothness, so as to obtain better display effects.

In an embodiment, when R−P<(M−1)*L, the grayscale value (of which the magnitude is R−P) is allocated to A groups in the remaining M−1 display groups with each group having a grayscale value of L, and the grayscale value (less than L) of the remaining part is allocated to the remaining M−1 display groups, wherein A is the integer part of (R−P)/L.

When R−P≥(M−1)*L, the grayscale value of each display group in the remaining M−1 display groups is at least L.

That is to say, when the grayscale value of the grayscale data satisfies R>Q, the magnitudes of R−P and (M−1)*L are compared to confirm the manner to allocate the grayscale value(the magnitude is R−P). The grayscale value of one display group is at least configured as Q (assuming as P). In the remaining M−1 display groups, the number of display groups with a grayscale value at least L is as large as possible. The above A is the maximum value that the number of the display groups with a grayscale value at least L in the remaining M−1 display groups can reach. For example, assuming that the grayscale value of one display group is configured as P, the remaining grayscale value(the magnitude is R−P) may be allocated as follows, the grayscale values of A display groups in the M−1 display groups are preferentially configured as L until the remaining grayscale value is less than L. At this time, the remaining grayscale value is then allocated as additional grayscale value to one or more display groups in the aforementioned M−1 display groups. For example, when M=4, R=17, P=Q=8, and L=4, the grayscale value of one display group is P=8, and the remaining grayscale value(the magnitude is 9) is allocated as follows, firstly, two groups from the other three display groups are selected, their grayscale values are respectively configured as 4, and the remaining unallocated grayscale value (magnitude is 1) is allocated to the three display groups. That is to say, the grayscale values of these four display groups may be 8, 4, 4, and 1, or 8, 5, 4, and 0.

Optionally, S=M*Q, that is, S is equal to the product of the number of display groups M and the centralized display threshold Q.

Optionally, when the grayscale value R is in the middle position, that is, Q<R≤M*Q, then S=M*Q, and the LED-display-screen drive chip may be configured such that:

when C≥L, the grayscale value of one display group in the M display groups is configured as Q+x, wherein x≥0, and the grayscale value of the i-th display group of the remaining M−1 display groups is configured as C+$x_i$, wherein $x_i$≥0, i∈{1, . . . , M−1}, wherein $$x \square \sum_{i \square 1}^{M-1} x_i \square D;$$

when C<L, the grayscale value of one display group in the M display groups is configured as Q+y, wherein y≥0, and the grayscale value of the j-th display group in the M−1−A display groups is configured as $z_j$, wherein $z_j$≥0, j∈{1, . . . , M−1−A}, wherein when A>0, the grayscale value of the k-th display group in A display groups in the M display groups is configured as L+$y_k$, wherein $y_k$≥0, k∈{1, . . . , A}, wherein $$y \square \sum_{k \square 1}^{A} y_k \square \sum_{j \square 1}^{M-1-A} z_j \square B;$$

and when A=0, $$y \square \sum_{j \square 1}^{M-1-A} z_j \square B;$$

wherein A and B are the integer part (that is, quotient) and the remainder part of (R−Q)/L, respectively, while C and D are the integer part (that is, quotient) and the remainder part of (R−Q)/(M−1), respectively.

It should be noted that, in the present disclosure, x, $x_i$, y, $y_k$, and $z_j$ are all greater than or equal to 0. In the present disclosure, A is an integer greater than or equal to 0. When A=0, the remainder B may be allocated to the centralized display group and/or other M−1 display groups (that is, all M display groups). That is to say, the grayscale value of one display group in M display groups is Q+B, and the grayscale value of other M−1 display groups is 0, or the grayscale value of one display group is Q, the grayscale value of another display group is B, and the grayscale value of other M−2 display groups is 0, or the grayscale value of one display group is Q+y, the grayscale value of another display group is B−y, and the grayscale value of other M−2 display groups is 0.

Optionally, when R>M*Q, the LED-display-screen drive chip is configured to allocate the grayscale data to the M display groups. At this time, the total grayscale value is relatively large, and in order to be even, the grayscale data is evenly allocated to all display groups as far as possible. It is understandable that the grayscale values of all display groups are greater than 0 at this time.

When the total grayscale value R of the grayscale data satisfies Q<R≤M*Q, the quotient A and remainder B of (R−Q)/L and the quotient C and remainder D of (R−Q)/(M−1) are calculated. The magnitudes of C and L are compared.

(1) When C≥L, it shows that when the grayscale value of one display group of the M display groups is configured as Q, in the remaining M−1 display groups, the magnitude of the grayscale value of each display group may be at least C. In order to ensure relative uniformity, the grayscale value of each display group of the M−1 display groups may be directly configured to at least C. The remaining unallocated grayscale value (magnitude is D) is then allocated as an additional grayscale value to one or more of the M display groups. That is to say, in the M−1 display groups, the grayscale value of the i-th display group is $C+x_i$, and the grayscale value of the remaining one display group is Q+x.

The grayscale value with the magnitude of remainder D may be allocated to one or more of all M display groups as an additional grayscale value. The additional grayscale value (for example, x and $x_i$) in each display group of the M display groups may be any value greater than or equal to 0 and less than or equal to D, and the sum of the additional grayscale values of the M display groups is D.

For example, it may be x□D. That is to say, the grayscale value of one display group is configured as Q+D, and the grayscale value of each display group in the remaining M−1 display groups is C.

Certainly, it may also be $$\sum_{i\square 1}^{M-1} x_i \square D,\ x \square 0.$$

That is to say, the grayscale value of one display group is configured as Q, and the grayscale value with the magnitude of the remainder D is allocated to the remaining M−1 display groups as an additional grayscale value. The additional grayscale value in each display group of the M−1 display groups may be any value greater than or equal to 0 and less than or equal to D, and the sum of the additional grayscale values of the M−1 display groups is D.

Preferably, $x_i \in \{0, 1\}$, $i \in \{1, \ldots, M-\mathbf{1}\}$. That is to say, D display groups are selected from the remaining M−1 display groups, and an additional grayscale value with a magnitude of 1 is allocated to each display group. The grayscale value of each display group in the D display groups is C+1. It is necessary to explain that the grayscale value in the present disclosure may be expressed as an integer only as needed, that is, R is an integer.

Certainly, one or more display groups may be selected from all M display groups for allocation. For example, D display groups are selected from the M display groups, and the additional grayscale value of each display group in the D display groups is 1.

(2) When C<L, it indicates that when the grayscale value of one display group of the M display groups is configured as Q, it is impossible that the grayscale value of each display group of the remaining M−1 display groups is able to reach L. At this time, partial display groups may be selected in this M−1 group (that is, A display groups, wherein A is an integer greater than or equal to 0 and less than or equal to M−1). The grayscale value of each selected display group is configured at least as L, and then the remaining unallocated grayscale value (magnitude is B) is allocated as an additional grayscale value in the M display groups.

It is possible that, when C<L and A>0 (A is an integer), $$\sum_{k\square 1}^{A} y_k \square B.$$

Due to y≥0, $z_j \geq 0$, $j \in \{1, \ldots, M-1-A\}$, then it must be y=0, and $z_j=0$. That is to say, the grayscale value with a magnitude of the remainder B is allocated to one or more display groups of the aforementioned A display groups. Preferably, one display group may be selected from the A display groups, and its grayscale value is directly configured as L+B, that is $y_k \in \{0, B\}$. At this time, for the grayscale data with a grayscale value which has a magnitude of R, the allocation manner in the M display groups is: the grayscale value in one display group is Q, the grayscale value in another display group is L+B, the grayscale value in each of A−1 display groups is L, and the grayscale value in the remaining display groups is 0.

It should be noted that it is the best that the magnitude of L+B does not exceed the maximum display grayscale threshold of each display group, otherwise it may cause overflow. In the present disclosure, M is preferably an integer greater than or equal to 3.

Figure 5:
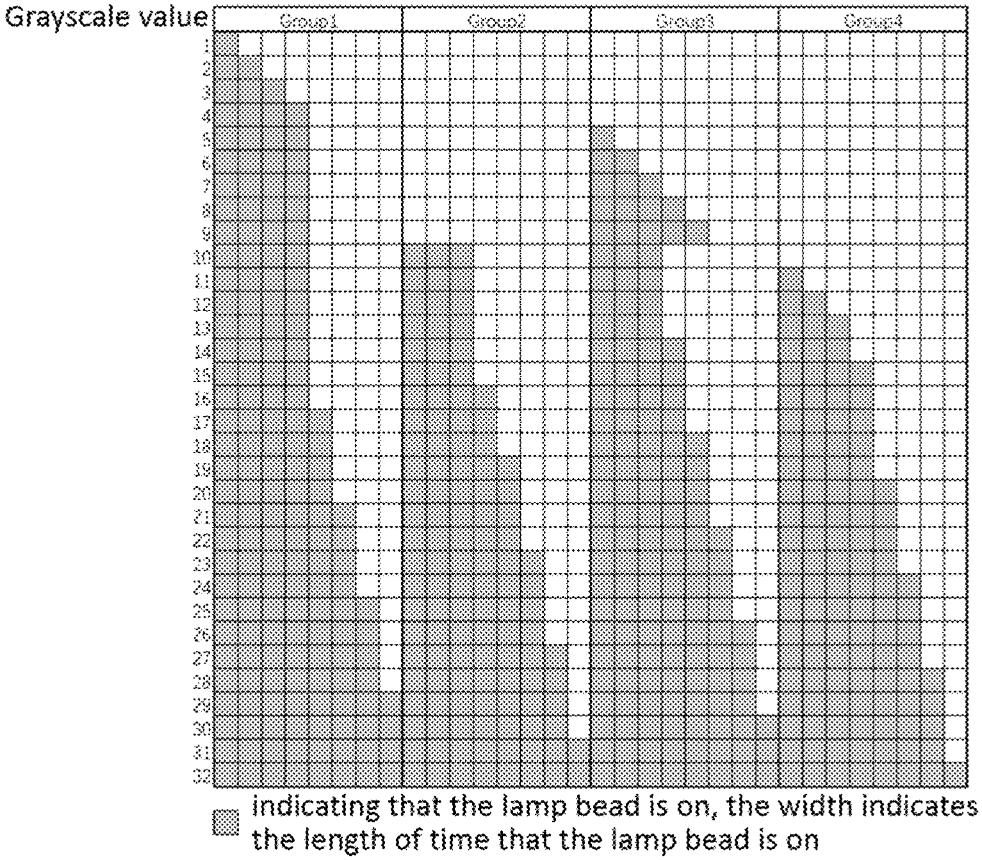
FIG. 5 is the third schematic diagram of grayscale allocation provided by another embodiment of the present disclosure.

Referring to FIGS. 5, L=3, and Q=4, when R=8, C=1, D=1, A=1, B=1, and C is less than L. At this time, because the grayscale value of the first display group is configured as 4, then one group is selected from the second to the fourth groups (here is the third group), and the remaining unallocated grayscale value (magnitude is 4) is configured to the third display group, that is, the grayscale value of the third display group is L+B=3+1. Therefore, when R=8, the total grayscale value of the first display group is 4, the total grayscale value of the third display group is 4, and the grayscale value of the other display groups is 0.

It may also be that when C<L, $$\sum_{j\square 1}^{M-1-A} z_j \square B,\ z_j \in \{0, B\}.$$

M−1−A must be an integer greater than 0 and less than or equal to M−1. At this time, y=0, when A is not equal to 0, $y_k \square 0$, $k \in \{1, \ldots, A\}$ and $$\sum_{k\square 1}^{A} y_k \square 0,$$

it indicates that one display group is allocated with a grayscale value of Q, and each of the A display groups has a grayscale value of L (that is, $y_k \square 0$, $k \in \{1, \ldots, A\}$) the grayscale value of another one display group is B, and the grayscale value of each of the other M−A−2 display groups (if any) is 0; and when A is 0, it indicates that one display group is allocated with a grayscale value of Q, and one display group is allocated with a grayscale value of B. The grayscale value of each of other M−2 display groups is 0.

Figure 4:
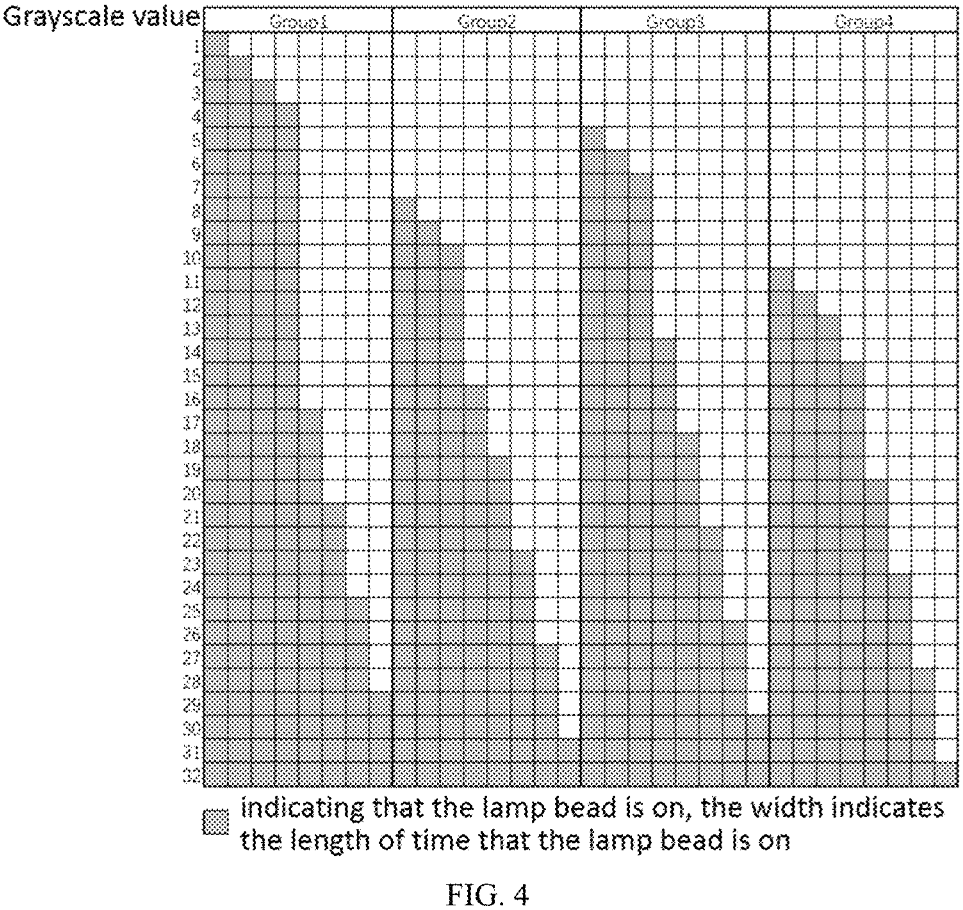
FIG. 4 is the second schematic diagram of grayscale allocation provided by another embodiment of the present disclosure.

Referring to FIGS. 4, L=3, and Q=4, when R=6, C=0, D=2, A=0, B=2, and C is less than L. At this time, the grayscale value of the first display group is configured as 4, and one group is selected from the second to the fourth groups (here is the third group), and its grayscale value is configured as B, that is, 2.

For another example, when R=9, C=1, D=2, A=1, and B=2. At this time, the grayscale value of the first display group is 4, the grayscale value of the third display group is configured as L (magnitude is 3), and the grayscale value of the second display group is B (magnitude is 2).

It may also be that when C<L, y=B and $$\sum_{j\square 1}^{M-1-A} z_j \square 0$$

(that is, $z_j \square 0$, $j \in \{1, \ldots, M-1-A\}$). When A is not equal to 0, $y_k \square 0$, $k \in \{1, \ldots, A\}$ and $$\sum_{k \square 1}^{A} y_k \square 0,$$

that is, the grayscale value of one display group is Q+B, the grayscale value of each display group in A display groups is L, and the grayscale value of each of other M−1−A display groups (if any) is 0; and when A=0, the grayscale value of one display group is Q+B, and the grayscale value of the other M−1 display groups is 0. It should be noted that it is the best that the magnitude of Q+B does not exceed the maximum display grayscale threshold of each display group, otherwise, it will cause overflow.

Certainly, it may also be that $$y \square \sum_{k \square 1}^{A} y_k \square B.$$

At this time, $z_j \square 0$, $j \in \{1, \ldots, M-1-A\}$. When M−1−A is equal to 0, then A=M−1.

It may also be that only one of $z_1, z_2, \ldots, z_{M-1-A}$ is not 0, such as being v, and the remaining grayscale value with a magnitude of B−v is allocated to other display groups, at this time, $$y \square \sum_{k \square 1}^{A} y_k \square B - v.$$

Figure 6:
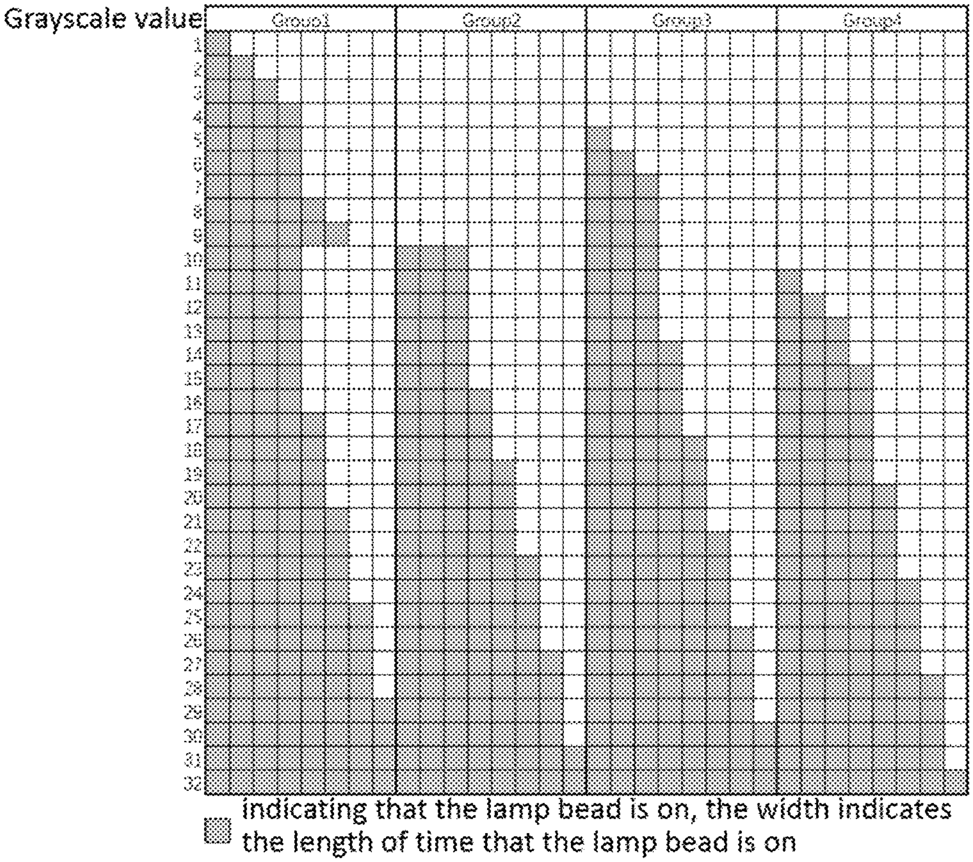
FIG. 6 is the fourth schematic diagram of grayscale allocation provided by another embodiment of the present disclosure.

Referring to FIG. 6, when R=9, C=1, D=2, A=1, and B=2. At this time, the grayscale value of one display group (Group 1) is 4+2, the grayscale of one display group (Group 3) is 3, the grayscale value of each of other display groups (Group 2 and Group 4) is 0.

In some embodiments, when R>M*Q, the LED-display-screen drive chip is configured such that:

the grayscale value of the h-th display group in the M display groups is $E+f_h$, wherein $h \in \{1, \ldots, M\}$ wherein $$\sum_{h \square 1}^{M} f_h \square F;$$

wherein E and F are the integer part and the remainder part (that is, quotient and remainder) of R/M, respectively.

When R>M*Q, it indicates that the grayscale value of the grayscale data is relatively large, and the grayscale value of each display group in the M display groups may be configured at least as Q. By calculating R/M, the quotient E, and the remainder F are obtained, and the grayscale value of each display group may at least be E. When the grayscale value for the initial allocation of each display group reaches E, the remaining unallocated grayscale value (magnitude is F) is relatively evenly allocated to M display groups.

Optionally, $f_h \in \{0, 1\}$, $h \in \{1, \ldots M\}$. By selecting F display groups from M display groups, the grayscale value of each selected display group is added by 1 on the basis of the initially allocated grayscale value E to obtain the final grayscale value. In this way, the grayscale value in each display group may be evenly allocated, so as to avoid the problem of unsmooth display.

Certainly, $f_h$ does not necessarily pick 0 or 1. In fact, it may be allocated arbitrarily. For example, when F=3, two display groups are selected, one is allocated with 2, and one is allocated with 1, as long as these display groups may accommodate the allocated grayscale value.

It should be noted that when the grayscale data of the present disclosure is expressed as an integer (that is, R is only an integer), at this time, preferably, the values of Q, L, x, $x_i$, y, $y_k$, $z_j$, and $f_h$ are all integers.

The present disclosure selects some groups from a plurality of groups to allocate grayscale value, which may perform selection in the following way.

An interval manner is adopted, which means that the non-adjacent display groups are preferentially selected to allocate the grayscale value until only the adjacent display groups are left, and then the remaining display groups are selected.

For example, Referring to FIG. 3, the total grayscale value is 5, and Q=4. The grayscale value of the first group is 4, and the remaining unallocated grayscale value (magnitude is 1) is preferentially allocated to the third or fourth group. Similarly, as shown in FIG. 4, when L is not equal to 1 (e.g. 3) and the grayscale value is between 5 and 7, the grayscale value of the first group is 4, and the remaining grayscale value (magnitude is 1 or 2 or 3) is preferentially allocated to the third group. When the grayscale value is between 8 and 10, the grayscale value of the first group is 4, and the grayscale value of the non-adjacent third group is 3. The remaining second group and the fourth group are adjacent to the first group and the third group that are previously selected, respectively. At this time, the remaining grayscale value (magnitude is 1 or 2 or 3) is allocated to the second or the fourth group.

It should also be noted that, in the present disclosure, the grayscale value of each display group should not exceed the preset maximum grayscale threshold. Generally, the maximum grayscale threshold is set to be relatively large, and the grayscale data is limited. The manners of allocation according to the present disclosure will not make the grayscale value allocated by each display group overflowed.

Figure 7:
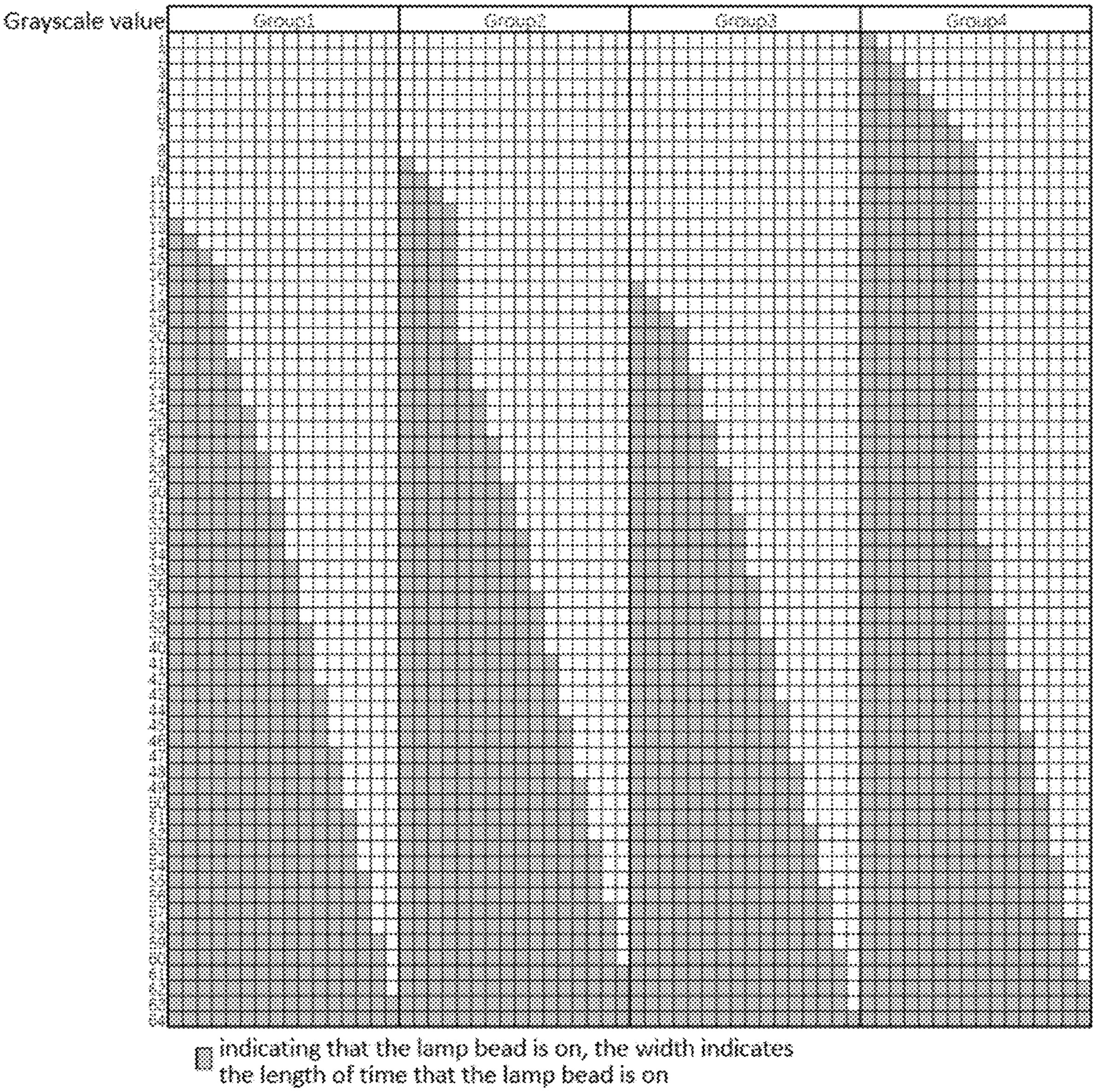
FIG. 7 is the fifth schematic diagram of grayscale allocation provided by another embodiment of the present disclosure.

Some embodiments of the present disclosure are illustrated in FIG. 7 below.

Taking L=4 as an example, referring to FIG. 7, the display data is 6-bit, the number of display groups is 4, and the centralized display grayscale level Q is 8. When the grayscale level is less than or equal to 8, it is concentrated in the fourth group to display; when the grayscale level is 9/10/11/12, the grayscale of level 8 is concentrated in the fourth group to display, and the remaining grayscale of level 1/2/3/4 is allocated to the second group to display; when the grayscale level is 13/14/15/16, the grayscale of level 8 is concentrated in the fourth group to display, the grayscale of level 4 is concentrated in the second group to display, and the remaining grayscale of level 1/2/3/4 is allocated to the first group to display; and when the grayscale level is 17/18/19/20, the grayscale of level 8 is concentrated in the fourth group to display, the grayscale of level 4 is concentrated in the second group to display, the grayscale of level 4 is concentrated in the first group to display, and the remaining grayscale of level 1/2/3/4 is allocated to the third group to display, and so on, until the grayscale level is 32, and the other three groups are fully allocated with grayscale level 8 set by concentrated display.

In the second aspect, the present disclosure provides an LED display screen, which includes a display panel and the aforementioned LED-display-screen drive chip.

The above description only shows the preferable embodiments of the present disclosure. It should be understood that the present disclosure is not limited to the form disclosed in this article, and should not be regarded as an exclusion of other embodiments, but may be used for a variety of other combinations, modifications, and environments, and may be modified through the technology or knowledge of the above teachings or related fields within the scope of the ideas described in this article. If the modifications and changes made by those skilled in the art are not divorced from the spirit and scope of the present disclosure, they should be within the protection scope of the claims attached to the present disclosure.

What is claimed is:

1. An LED-display-screen drive chip, wherein the drive chip is configured such that:

when a grayscale value R of a grayscale data is less than or equal to Q, the grayscale data is allocated to one display group in M display groups; and when a grayscale value R of a grayscale data is larger than Q, a grayscale value of one display group of the M display groups is configured as P, wherein P>=Q, and a total grayscale value of remaining M−1 display groups is R−P, wherein, among the remaining M−1 display groups, the number of display groups, whose grayscale values are each less than L but not 0, is not more than 1, wherein L≥1, Q>L, and Q is a centralized display threshold.

2. The LED-display-screen drive chip according to claim 1, wherein when R−P<(M−1)*L, the grayscale value, of which the magnitude is R−P, is allocated to A groups in the remaining M−1 display groups with each group having a grayscale value of L, and the remaining grayscale value which is less than L is allocated to the remaining M−1 display groups, wherein A is an integer part of (R−P)/L; and when R−P≥(M−1)*L, a grayscale value of each display group in the remaining M−1 display groups is at least L.

3. The LED-display-screen drive chip according to claim 1, wherein when Q<R≤M*Q, the LED-display-screen drive chip is further configured such that:

when C≥L, a grayscale value of one display group in the M display groups is configured as Q+x, wherein x≥0, and a grayscale value of the i-th display group in the remaining M−1 display groups is configured as C+$x_i$, wherein $x_i$≥0, i∈{1, . . . , M−1}, wherein $$x\square\sum_{i\square 1}^{M-1} x_i\square D;$$

and when C<L, a grayscale value of one display group in the M display groups is configured as Q+y, wherein y≥0, and a grayscale value of the j-th display group in M−1−A display groups is configured as $z_j$, wherein $z_j$≥0, j∈{1, . . . , M−1−A}, wherein when A>0, a grayscale value of the k-th display group in A display groups in the M display groups is configured as L+$y_k$, wherein $y_k$≥0, k∈{1, . . . , A} and $$y\square\sum_{k\square 1}^{A} y_k\square\sum_{j\square 1}^{M-1-A} z_j\square B;$$

and when A=0, $$y\square\sum_{j\square 1}^{M-1-A} z_j\square B,$$

wherein A and B are an integer part and a remainder part of (R−Q)/L, respectively, and C and D are an integer part and a remainder part of (R−Q)/(M−1), respectively.

4. The LED-display-screen drive chip according to claim 3, wherein, when C<L and A>0, $$\sum_{k\square 1}^{A} y_k\square B.$$

5. The LED-display-screen drive chip according to claim 3, wherein when C<L, $$\sum_{j\square 1}^{M-1-A} z_j\square B,\ z_j\in\{0, B\}.$$

6. The LED-display-screen drive chip according to claim 3, wherein when C<L, y=B.

7. The LED-display-screen drive chip according to claim 3, wherein when C≥L, $$\sum_{i\square 1}^{M-1} x_i\square D,\ x\square 0.$$

8. The LED-display-screen drive chip according to claim 7, wherein $x_i$∈{0, 1}, and i∈{1, . . . , M−1}.

9. The LED-display-screen drive chip according to claim 3, wherein when R>M*Q, the LED-display-screen drive chip is configured such that:

a grayscale value of the h-th display group in the M display groups is E+$f_h$, wherein h∈{1, . . . , M}, wherein $$\sum_{h\square 1}^{M} f_h\square F,$$

and E and F are an integer part and a remainder part of R/M, respectively.

10. The LED-display-screen drive chip according to claim 9, wherein $f_h$∈{0, 1}, and h∈{1, . . . , M}.

11. An LED display screen, comprising a display panel and the LED-display-screen drive chip according to claim 1.

12. The LED-display-screen drive chip according to claim 2, wherein when Q<R≤M*Q, the LED-display-screen drive chip is further configured such that:

when C≥L, a grayscale value of one display group in the M display groups is configured as Q+x, wherein x≥0, and a grayscale value of the i-th display group in the remaining M−1 display groups is configured as C+$x_i$, wherein $x_i$≥0, i∈{1, . . . , M−1}, wherein $$x \square \sum_{i \square 1}^{M-1} x_i \square D;$$

and when C<L, a grayscale value of one display group in the M display groups is configured as Q+y, wherein y≥0, and a grayscale value of the j-th display group in M−1−A display groups is configured as $z_j$, wherein $z_j$≥0, j∈{1, . . . , M−1-A}, wherein when A>0, a grayscale value of the k-th display group in A display groups in the M display groups is configured as L+$y_k$, wherein $y_k$≥0, k∈{1, . . . , A} and $$y \square \sum_{k \square 1}^{A} y_k \square \sum_{j \square 1}^{M-1-A} z_j \square B;$$

and when A=0, $$y \square \sum_{j \square 1}^{M-1-A} z_j \square B,$$

wherein A and B are an integer part and a remainder part of (R−Q)/L, respectively, and C and D are an integer part and a remainder part of (R−Q)/(M−1), respectively.

13. The LED-display-screen drive chip according to claim 4, wherein when R>M*Q, the LED-display-screen drive chip is configured such that:

a grayscale value of the h-th display group in the M display groups is E+$f_h$, wherein h∈{1, . . . , M}, wherein $$\sum_{h \square 1}^{M} f_h \square F,$$

and E and F are an integer part and a remainder part of R/M, respectively.

14. The LED-display-screen drive chip according to claim 5, wherein when R>M*Q, the LED-display-screen drive chip is configured such that:

a grayscale value of the h-th display group in the M display groups is E+$f_h$, wherein h∈{1, . . . , M}, wherein $$\sum_{h \square 1}^{M} f_h \square F,$$

and E and F are an integer part and a remainder part of R/M, respectively.

15. The LED-display-screen drive chip according to claim 6, wherein when R>M*Q, the LED-display-screen drive chip is configured such that:

a grayscale value of the h-th display group in the M display groups is E+$f_h$, wherein h∈{1, . . . , M}, wherein $$\sum_{h \square 1}^{M} f_h \square F,$$

and E and F are an integer part and a remainder part of R/M, respectively.

16. The LED-display-screen drive chip according to claim 7, wherein when R>M*Q, the LED-display-screen drive chip is configured such that:

a grayscale value of the h-th display group in the M display groups is E+$f_h$, wherein h∈{1, . . . M}, wherein $$\sum_{h \square 1}^{M} f_h \square F,$$

and E and F are an integer part and a remainder part of R/M, respectively.

17. The LED-display-screen drive chip according to claim 8, wherein when R>M*Q, the LED-display-screen drive chip is configured such that:

a grayscale value of the h-th display group in the M display groups is E+$f_h$, wherein h∈{1, . . . , M}, wherein $$\sum_{h \square 1}^{M} f_h \square F,$$

and E and F are an integer part and a remainder part of R/M, respectively.

18. The LED display screen according to claim 11, wherein when Q<R≤M*Q, the LED-display-screen drive chip is further configured such that:

when C≥L, a grayscale value of one display group in the M display groups is configured as Q+x, wherein x≥0, and a grayscale value of the i-th display group in the remaining M−1 display groups is configured as C+$x_i$, wherein $x_i$≥0, i ∈{1, . . . , M−1}, wherein $$x \square \sum_{i \square 1}^{M-1} x_i \square D;$$

and when C<L, a grayscale value of one display group in the M display groups is configured as Q+y, wherein y≥0, and a grayscale value of the j-th display group in M−1−A display groups is configured as $z_j$, wherein $z_j$≥0, j∈{1, . . . , M−1−A}, wherein when A>0, a grayscale value of the k-th display group in A display groups in the M display groups is configured as $L+y_k$, wherein $y_k \geq 0$, $k \in \{1, \ldots, A\}$ and $$y \square \sum_{k \square 1}^{A} y_k \square \sum_{j \square 1}^{M-1-A} z_j \square B;$$

and when A=0, $$y \square \sum_{j \square 1}^{M-1-A} z_j \square B,$$

wherein A and B are an integer part and a remainder part of (R−Q)/L, respectively, and C and D are an integer part and a remainder part of (R−Q)/(M−1), respectively.

19. The LED display screen according to claim 18, wherein, when C<L and A>0, $$\sum_{k \square 1}^{A} y_k \square B.$$

20. The LED display screen according to claim 18, wherein when C<L, $$\sum_{j \square 1}^{M-1-A} z_j \square B,\ z_j \in \{0, B\}.$$

* * * * *